(12) United States Patent
Odell (10) Patent No.: US 7,027,634 B2
(45) Date of Patent: *Apr. 11, 2006

(54) RANGE ADAPTABLE SYSTEM FOR DETERMINING THE ANGULAR POSITION AND DISTANCE OF A RADIATING POINT SOURCE AND METHOD OF EMPLOYING

(75) Inventor: Don Odell, Milton, VT (US)

(73) Assignee: Ascension Technology Corporation

( * ) Notice: Subject to any disclaimer, the term of this patent is extended or adjusted under 35 U.S.C. 154(b) by 905 days.

This patent is subject to a terminal disclaimer.

(21) Appl. No.: 10/073,335

(22) Filed: Feb. 13, 2002

(65) Prior Publication Data

US 2003/0152290 A1 Aug. 14, 2003

(51) Int. Cl.
*G06K 9/00* (2006.01)
*G01N 21/00* (2006.01)

(52) U.S. Cl. .................... 382/144; 382/145; 356/237.4
(58) Field of Classification Search ............... 382/144, 382/145; 356/237.2–5
See application file for complete search history.

(56) References Cited

U.S. PATENT DOCUMENTS

| 5,185,815 A | * | 2/1993 | Brandstetter | 382/211 |
| 5,640,241 A | * | 6/1997 | Ogawa | 356/615 |
| 6,457,169 B1 | * | 9/2002 | Ross | 716/21 |

* cited by examiner

*Primary Examiner*—Vikkram Bali
*Assistant Examiner*—Wes Tucker
(74) *Attorney, Agent, or Firm*—H. Jay Spiegel (57) ABSTRACT

A patterned mask is located at a distance from a linear detector array. A point radiating source illuminates the aperture to cast an image onto the array. A computer is employed to identify frequencies in the frequency domain to determine the image scale and shift along the detector array axis. Determination of the magnification of the aperture image is made employing frequency domain techniques, the aperture pattern being re-scaled to match that of the actual image, so that determination of pattern shift can be made. A first embodiment of the present invention has two variations, one of which employs the use of multiple single frequency components and phase methodology, the second of which uses multiple single frequency components as well as a variable frequency component. In a second embodiment, a composite image is also used except that only one single frequency component is used in addition to a non-periodic function.

22 Claims, 11 Drawing Sheets

RANGE ADAPTABLE SYSTEM FOR DETERMINING THE ANGULAR POSITION AND DISTANCE OF A RADIATING POINT SOURCE AND METHOD OF EMPLOYING

BACKGROUND OF THE INVENTION

The present invention relates to methods of employing a range adaptable system for determining the angular position and distance of a radiating point source as well as the system itself. In the present invention, radiation from a point source travels through a window mask pattern and onto the surface of a sensor. In the prior art, this general concept is well known, however, the prior art fails to teach or suggest the specific techniques employed by Applicant to accurately measure angular position and distance using such a structure.

Prior art systems have used masked or coded apertures placed above multi-element detectors. All of these techniques have attempted to determine the position of a projected pattern on a detector surface by comparing signals from fixed detector elements arranged in a unique pattern or from comparison to fixed reference signals previously stored in a computer. Such techniques result in limited resolution due to the fact that the magnified mask projection due to point source illumination does not precisely correlate or match the fixed detector pattern or reference signal.

As an example of the effect of magnification on the alignment process, resolving patterns with as many as 100 line/space pairs, there must be less than one part in 400 magnification in order to preserve correlation with a fixed reference. This level of magnification may typically occur at a distance of between 2 and 4 meters (6 to 13 feet), which represents the outer range of most optical position measurement systems. In order to facilitate operation at closer distances, with high resolution performance, a means of scale identification is required. It is with this notion in mind, among others, that the present invention was developed.

The following prior art is known to Applicant:

U.S. Pat. Nos. 4,193,689 and 4,314,761, both to Reymond et al. disclose arrangements for locating radiating point sources including the use of a single axis detector array and an aperture mask containing a slit to project light onto the array. In the earlier patent, a cylinder lens is used, and in the later patent, the cylinder lens is replaced with an aperture that can be shuttered to allow light in from preferred directions. In each case, three single axis arrays are used, and three cameras are required to compute three planes that intersect to define a point in space. The embodiments of the present invention differ from the teachings of the Reymond et al. patents since they include computing means to determine scales and shifts of image components and wherein the mask is not a single slit.

U.S. Pat. No. 4,209,780 to Fenimore et al. and U.S. Pat. No. 4,389,633 to Fenimore disclose the technique of using uniformly redundant arrays for coded aperture imaging. Correlation between mask and image is used to determine a lag function of the received mask pattern. A mosaic pattern is disclosed as yielding results superior to those yielded through the use of a random array. In the Fenimore '633 patent, the mask and detector are either one or two dimensional. The Fenimore '780 patent only discloses two dimensional imaging. The present invention differs from the teachings of the Fenimore patents since it does not compare image to a fixed reference pattern.

U.S. Pat. No. 4,435,838 to Gourlay discloses the concept of imaging planes of various distances in the field of tomographic imaging. The Gourlay technique improves the prior art process of selecting various image sizes to correlate with detector response to select a particular depth plane. Gourlay teaches the setting of a coded aperture at a distance D/d, where D is the object-to-detector distance and d is the object-to-mask distance, so that the image can be kept at the same magnification, thereby simplifying the correlation process. The present invention differs from both that of Gourlay and that of prior art systems in the field of tomographic imaging, since, in the present invention, various object-to-mask distances or various image sizes are not chosen to select a particular depth, but, instead, the mask image scale is automatically determined using frequency domain techniques.

Applicant is also aware of U.S. Pat. Nos. 5,408,323 to Mitchelson and 6,141,104 to Schulz. Each of these references teaches the concept of the use of a random pattern mask or universal redundant array. In each of these patents, measurement is conducted by comparing actual measurements to previously stored reference measurements. Over and above the reasons why the present invention, in its embodiments, patentably distinguishes from the Reymond et al. patents, the present invention distinguishes from Fenimore, Mitchelson, Gourlay and Schulz as specifically avoiding comparison of actual measurements to reference measurements.

SUMMARY OF THE INVENTION

The present invention relates to methods of employing a range adaptable system for determining angular position and distance of a radiating point source as well as the system itself. The present invention includes the following interrelated objects, aspects and features:

(1) The present invention is disclosed in terms of two preferred embodiments. In each of these embodiments, a patterned mask or coded aperture is located at a distance from a linear array comprising a detector surface. The mask pattern consists of a transmissivity pattern varying in one dimension, e.g., in the Y-axis. In each of the embodiments, a point radiating source illuminates the aperture to cast an image onto the array. Computing means is employed to identify one or more frequencies in the frequency domain to determine the image scale and shift along the detector array axis.

(2) In further amplification of the BACKGROUND OF THE INVENTION, the main distinction between the embodiments of the present invention and the prior art is that, in the present invention, a method of determination is employed that automatically allows determination of the magnification of the aperture image, with this method employing frequency domain techniques. The prior art fails to teach or suggest a way to account for image magnification that occurs due to the proximity of the source and the detector. Through the use of the techniques disclosed herein, the aperture pattern is automatically re-scaled to match that of the actual image, so that an accurate determination of pattern shift can be made.

Figure 16:
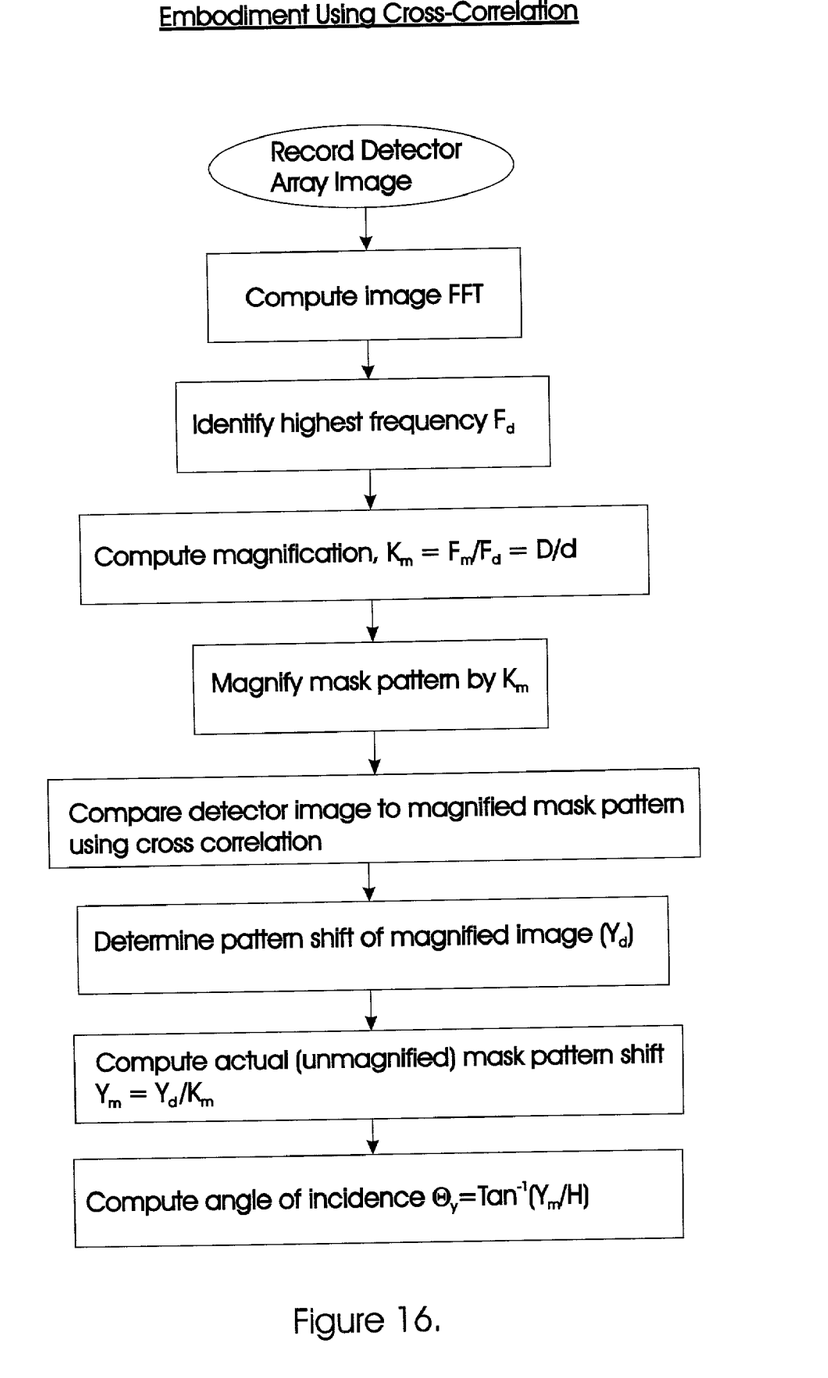
FIG. 16 shows a flowchart of operation of the first embodiment.

(3) A first embodiment of the present invention has two variations, one of which employs the use of multiple single frequency components and phase methodology, the second of which uses multiple single frequency components as well as a variable frequency component, all of which are identified in "frequency domain." The particular locations of frequency components as well as the corresponding phases of single frequency components allow the determination of the magnified image shift on the detector axis. The flowchart of FIG. 16 depicts these variations.

(4) In the first variation, measurement of the frequency and phase of the lowest frequency component is used to determine a coarse position measurement and is also used to measure the particular cycle of the next higher frequency component. In the same manner, the frequency and phase of the next higher frequency component is used to determine the detector position to a finer degree. As before, at the same time, the next higher frequency component is also used to determine the particular cycle of the next higher frequency component as the measurements become finer and more accurate consecutively.

(5) Eventually, the exact pattern shift is determined and from this information, the angle of incidence between the point source of radiation and the detector is determined.

(6) One example of an application uses a 4,096 element CCD array with a mask pattern containing four frequencies, including the fundamental frequency $f_0$ with period of 4,096 pixels, $f_1=4*f_0$, $f_2=16*f_0$, and $f_3=64*f_0$. The mask length (~8192 pixels) is longer than the detector to ensure that the detector is fully covered by the pattern for all source positions. The phase determination of each of the spectral peaks allows resolving to finer and finer degrees as with a vernier caliper.

(7) A convenient mathematical encryption of the spectral peak frequency and phase data (without using the final interpolation routine) uses a 4 digit number (base 4), where each digit defines one of four 90° positions for that spectral component. The MSB ($Nf_0$) corresponds to the observed fundamental frequency and the LSB ($Nf_1$) corresponds to the highest frequency component. Using D to represent the detector length, the pattern position ($Y_d$) is calculated as:

$$Y_d = [(N_{f0}*4^3 + N_{f1}*4^2 + N_{f2}*4^1 + N_{f3}*4^0)/(4*f_3)]*D$$

The interpolated residual of the $f_4$ phase is included in this result to give a more accurate position along the detector surface. The pattern magnification is then determined by dividing the maximum detected single frequency ($F_d$ equals $f_3$ in this example) by the known maximum mask frequency ($F_m$).

$$K_m = F_d/F_m$$

The center of the mask segment illuminated by the point source ($Y_m$) is computed from the detector position and the pattern magnification by:

$$Y_m = Y_d/K_m$$

The angle of incidence ($\theta i$) is determined from the mask height $X_m$ and the mask position by:

$$\theta i = \text{Tan}^{-1}(Y_m/X_m)$$

(8) In the second variation, a variable frequency component is employed in addition to the multiple single frequency components. As seen in FIG. 16, after magnification of the point source light beam image on the detector has been computed, the variable frequency component peak is calculated to yield coarse position data. Thereafter, in conformance with the first variation, phases of frequency components are determined, and so on.

(9) Another aspect of the present invention is to determine the distance of the point source from the mask surface. This can be determined in two degrees of position.

$$X_s = X/(K_m - 1)$$

$$Y_s = Y_m + X_s * \text{Tan}(\theta i).$$

The accuracy of the distance calculation depends on distance and detector size. In general, the accuracy will only be good at close distances, e.g., $K_m > 1.1$, but for certain applications, this may be adequate. A second detector of this type placed in an orthogonal position to the first detector allows determination of a second radiation angle, as well as a distance projected orthogonally to its axis. From this information, the point source position (x,y,z) can be determined.

(10) In the second embodiment of the present invention, a composite image is also used except that only one single frequency component is used in addition to a non-periodic function provided with unique auto-correlation. The single frequency function is used to determine the aperture image magnification. This scale factor is then used to resize the aperture image to correspond to the received image.

(11) The two functions can then be cross-correlated in a manner explained in greater detail below to yield the precise image displacement on the detector surface. Generally speaking, only the function of the masked pattern that has a unique auto-correlation is employed in the correlating function. However, the single frequency component may also be used in the correlating function since this results in a periodic ripple superimposed on the unique cross-correlation function. In this way, the single frequency component is only required for scale determination and is not required in the cross-correlation function.

As such, it is a first object of the present invention to provide embodiments of a range adaptable system for determining angular position and distance of a radiating point source.

It is a further object of the present invention to provide such a system in which a patterned mask or coded aperture is located at a distance from a linear array detector and interposed between the linear array detector and a point source of radiation.

It is a still further object of the present invention to provide such a system which permits actual measurements of angular position and distance of a radiating point source from a detector without resort to comparison with reference data.

It is a yet further object of the present invention to provide such a system and method in which multiple single frequency components and phase methodology are employed in the measuring process.

It is a yet further object of the present invention to provide such a system and method in which multiple single frequency components as well as a variable frequency component are employed in the measuring process.

It is a still further object of the present invention to provide such a system and method, in another embodiment, in which only a single frequency component is used in addition to a non-periodic function having unique auto-correlation.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

A first embodiment of the present invention is disclosed in detail with reference to FIGS. 1–16. A primary aspect of the first embodiment of the present invention describes a method for determining the angular position of a point source of radiation with respect to a detector by examining the scales and shifts of periodic components of the projected image of a variable transmissivity mask. The preferred embodiment encodes the transmissivity mask with several frequencies that have logarithmic separations and computes the frequency spectrum of the received detector pattern.

Figure 1:
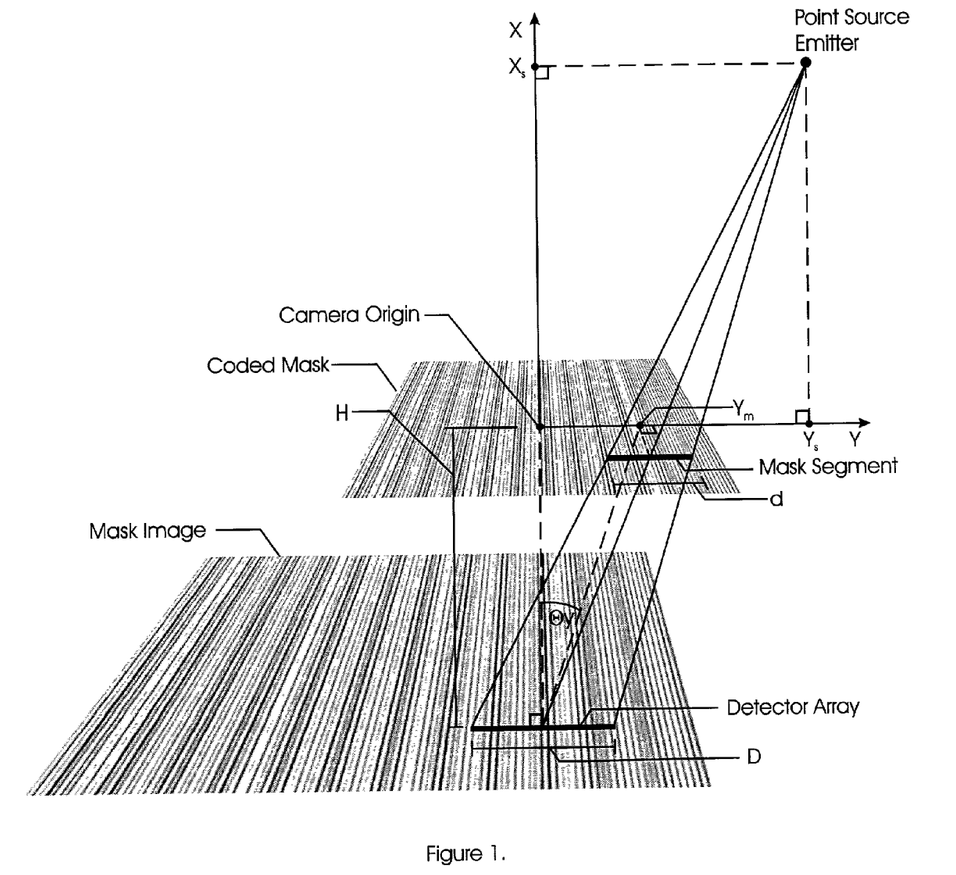
FIG. 1 shows a schematic perspective representation of the spatial relationship between a point source of radiation, a window mask pattern, and a detector.

With reference to FIGS. 1–4, the configuration of the system used to practice the method is seen. With reference, first, to FIG. 1, the system is generally designated by the reference numeral 10 and includes a point source emitter 11 designed to emit a point source of light having a beam 13 that may travel toward a coded planar mask 15. The mask is shown as including a plurality of lines 17 thereon defining a transmissivity pattern varying in one dimension (in the Y-axis). The beam 13 travels through the mask 15 and impinges on a planar detector array 19. The mask and detector preferably lie in parallel planes. FIG. 1 shows the image of the mask 15 projected onto the detector array 19. Reference numeral 21 refers to a mask segment that is projected onto the detector array 19 as shown by reference numeral 23, with the length of the segment designated by the reference numeral 23 being larger than the length of the mask segment 21 to a degree based upon the distance from the emitter 11 to the detector array 19. The distance H between the coded mask 15 and the detector array 19 has a bearing on the ratio between the length of the mask segment 21 and the length of the array segment 23. As such, when the system is being set up to practice the inventive method, the distance H is programmed into the computer (not shown). The length of the mask segment 21 is shown by the letter "d" and the length of the array segment 23 is shown by the letter "D."

Figure 2:
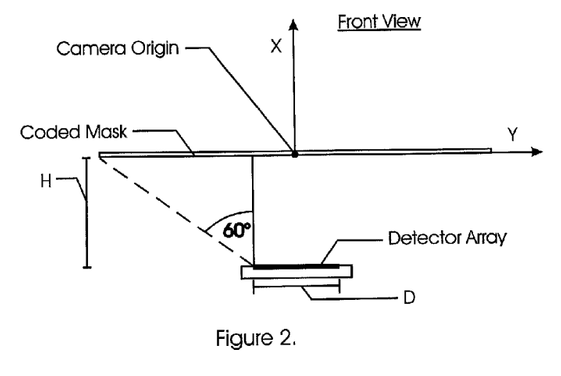
FIG. 2 shows a front view of the FIG. 1 representation.
Figure 3:
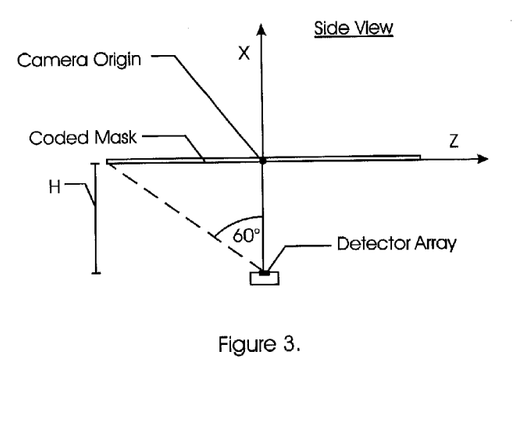
FIG. 3 shows a side view of the FIG. 1 representation.
Figure 4:
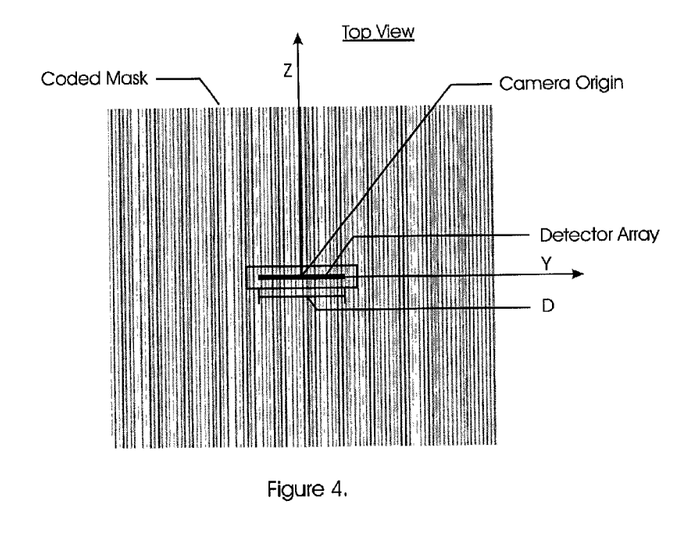
FIG. 4 shows a top view of the FIG. 1 representation.

FIGS. 2, 3 and 4 show front, side and top views, respectively, of the system 10.

Figure 5:
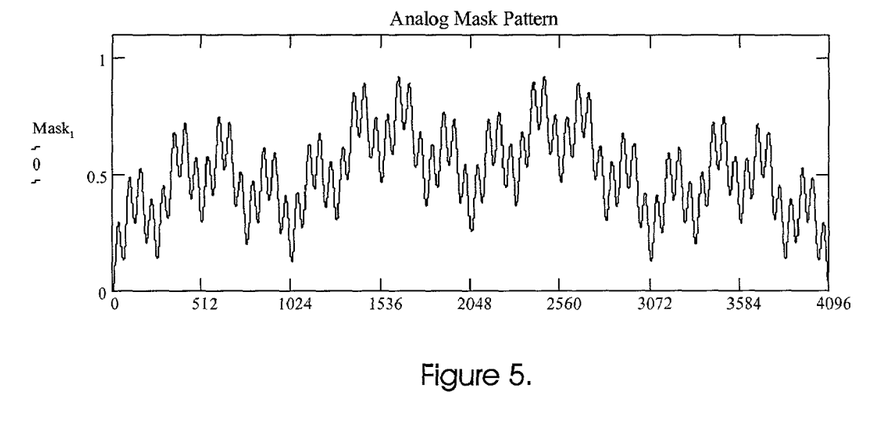
FIG. 5 shows a schematic representation of an analog mask pattern for a first embodiment of the present invention.
Figure 6:
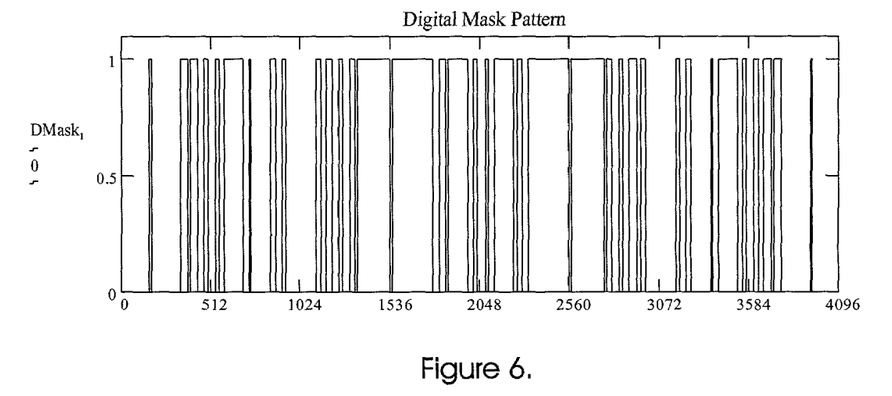
FIG. 6 shows a schematic representation of a digital detector pattern for the first embodiment of the present invention.
Figure 7:
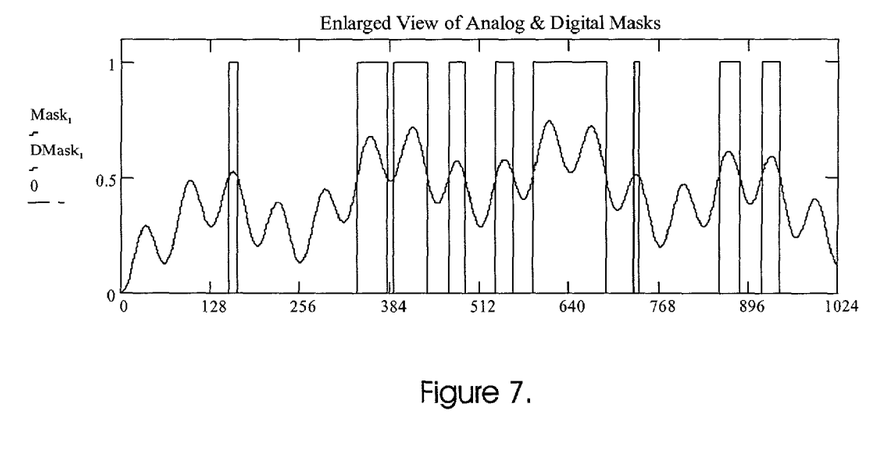
FIG. 7 shows an enlarged view of superimposed analog and digital masks of the first embodiment.

FIG. 5 shows a function containing the composite frequency function used to produce an analog or grey scale mask, while FIG. 6 shows the digital version of the same function. FIG. 7 is an enlargement showing both analog and digital representations.

Figure 8:
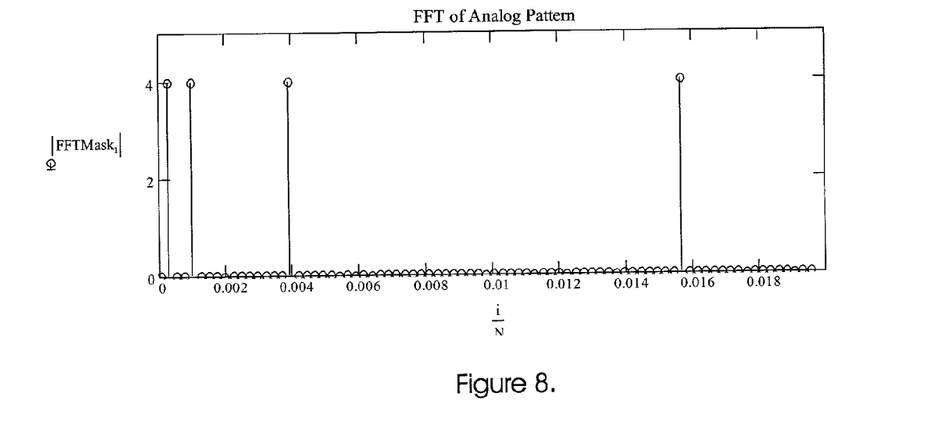
FIG. 8 shows a fast Fourier transform of the analog pattern of the first embodiment.
Figure 9:
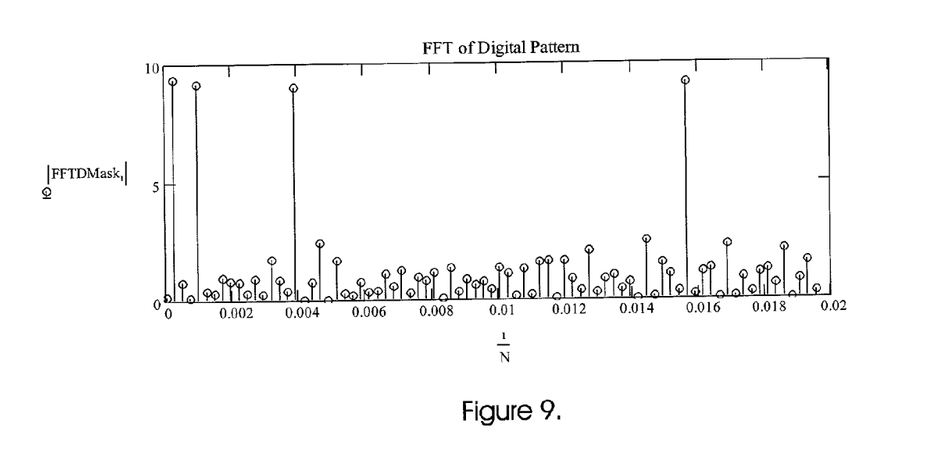
FIG. 9 shows a fast Fourier transform of the digital pattern of the first embodiment.

FIG. 8 is a Fourier Frequency Transform (FFT) of the mask pattern of FIG. 5, showing the spectral components, while FIG. 9 is the FFT of the mask of FIG. 6. The analog mask produces no harmonic content, which shows up as noise in frequency domain and is preferred over the digital mask.

Figure 10:
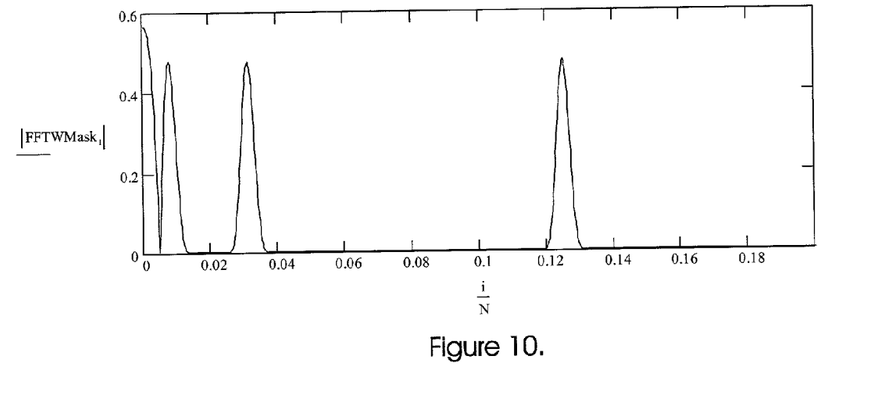
FIG. 10 shows the interpolated fast Fourier transform of the analog pattern of the first embodiment.
Figure 11:
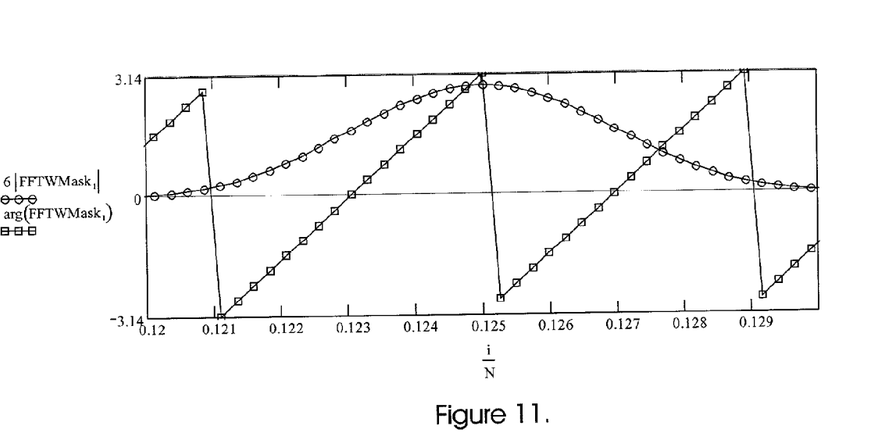
FIG. 11 shows the interpolated fast Fourier transform of a particular frequency component of the analog pattern of the first embodiment.

FIG. 10 shows the interpolated FFT plot of the mask pattern of FIG. 5, showing in high detail the four spectral peaks. FIG. 11 is an enlarged view of the FFT plot of FIG. 10 showing the magnitude and phase of a single spectral component.

From FFT plots of FIGS. 8–11, the spectral peaks may be determined, which indicate the received pattern frequencies. The corresponding phases indicate the position of each component. Because the point source is not located at infinity, the detected image pattern is never equal to the mask image, but is always magnified, with magnifications as much as 1.05:1 to 1.1:1. The spectral peaks are determined to a finer resolution than that of a detector pixel using interpolation. A typical application might use a 4,096 element CCD array with a mask pattern containing four frequencies, including the fundamental frequency $f_o$ with period of 4,096 pixels, $f_1=4*f_o$, $f_2=16*f_o$, and $f_3=64*f_o$. The mask length (~8192 pixels) is longer than the detector length to ensure that the detector is fully covered by the pattern for all source positions. The phase determination of each of the spectral peaks, successively, allows resolving the solution to finer and finer degrees as with a vernier caliper. A convenient mathematical encryption of the spectral peak frequency and phase data (without using the final interpolation routine) uses a 4 digit number (base 4), where each digit $N_{fx}$ defines one of four 90° positions for that spectral component. The MSB corresponds to the observed fundamental frequency and the LSB corresponds to the highest frequency component. The pattern position is calculated as $$Y_d=[(N_{f0}*4^3+N_{f1}*4^2+N_{f2}*4^1+N_{f3}*4^0)/(4*f_3)]*D$$

The interpolated residual of the $f_3$ phase is added to this result to give a more accurate angular position. FIG. 11 shows the interpolated Fast Fourier Transform (FFT) of a particular frequency component. The phase in the vicinity of the peak response is linear and the phase and frequency corresponding to the FFT magnitude peak yields the desired pattern shift.

A variation in the first embodiment uses an additional component to the mask pattern, which is a sinusoid with spatially varying frequency. A preferred spatial dependency is linear dependence. The FFT of the image received by the detector array allows determination of the centroid of the varying frequency component and from this information, the approximate pattern position and corresponding angle of incidence are known. From this approximate solution, the phases of the single frequency components can be determined in sequence as explained above. The advantage and novelty of this variation is that the mask can be made much larger than the fundamental period of one array length. This also allows for the mask to be kept at a much greater distance from the detector surface, increasing the angular sensitivity and the ability to manufacture the device.

The following equation expresses the mask transmissivity function:

$$Mask_1 := 0.5 + \left[\cos\left(\frac{i \cdot 100}{1024} \cdot 2 \cdot \pi\right) + \cos\left(\frac{i \cdot 20}{1024} \cdot 2 \cdot \pi\right) + \cos\left(\frac{i \cdot 4}{1024} \cdot 2 \cdot \pi\right) + \cos\left[\frac{i \cdot 45}{1024} \cdot 2 \cdot \pi \cdot \left[1 + \frac{\left(i - \frac{5}{2} \cdot 1024\right)}{\frac{5}{2} \cdot 1024} \cdot 0.3\right]\right]\right]$$

Figure 12:
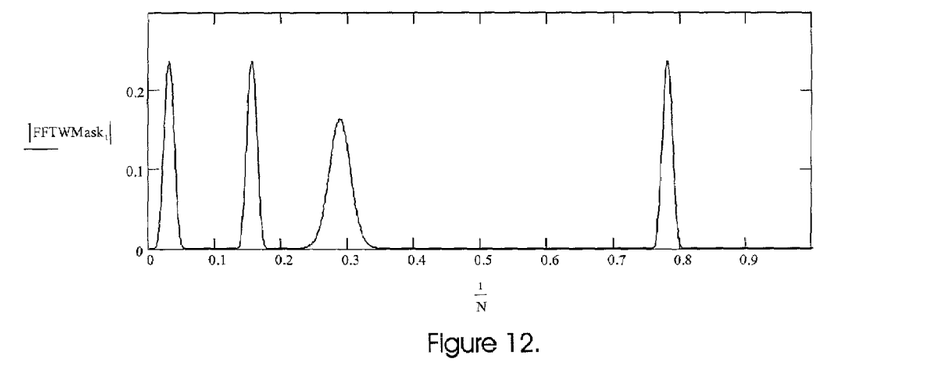
FIG. 12 shows a fast Fourier transform of the mask with a first chirped frequency.
Figure 13:
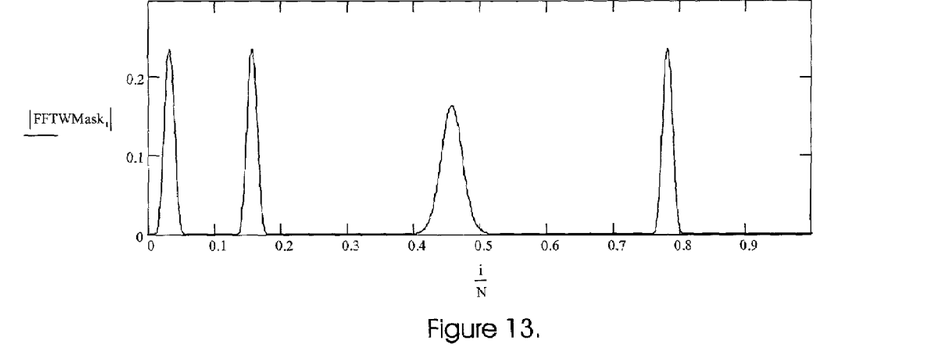
FIG. 13 shows a fast Fourier transform of the mask with a second chirped frequency.
Figure 14:
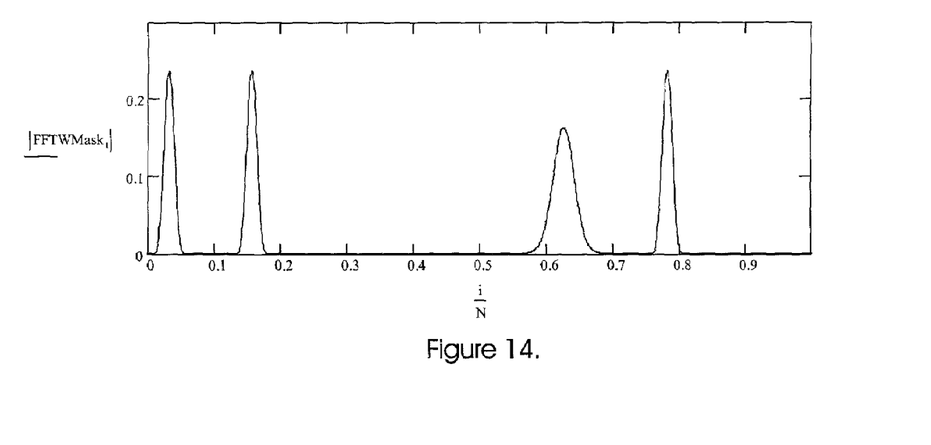
FIG. 14 shows a fast Fourier transform of the mask with a third chirped frequency.
Figure 15:
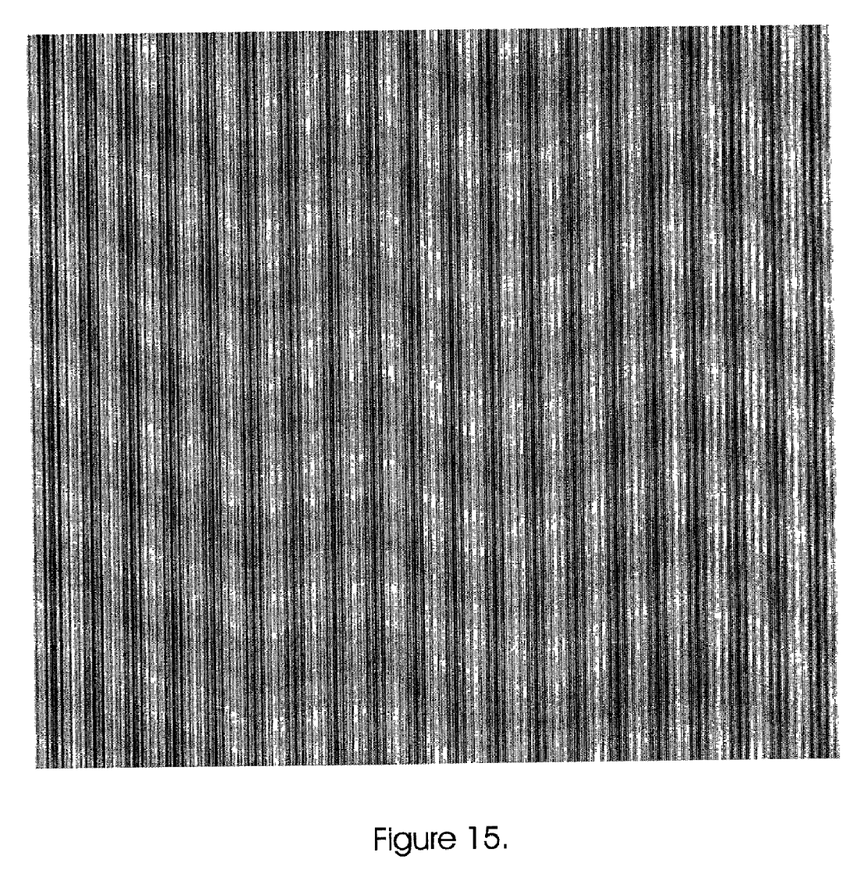
FIG. 15 shows the mask used to produce the fast Fourier transform plots illustrated in FIGS. 12, 13 and 14.

FIGS. 12, 13 and 14 are FFT plots showing shifts in the variable frequency component for two spatial shifts of the received mask. FIG. 15 is the mask used to produce FFT plots of FIGS. 13 and 14.

To account for magnification of the mask image at close ranges, the received variable frequency component is scaled by the reciprocal of the magnification as determined from detection of single frequency spectral components. A prior knowledge of the mask frequency components is assumed.

Another aspect of this invention determines the distance of the point source from the mask surface. This can be determined in two degrees of position.

$X_s = H/(K_m - 1)$ $Y_s = Y_m + X_s * \mathrm{Tan}(\theta i)$

The accuracy of the distance calculation depends on distance and detector size. In general, the accuracy will only be good at close distances, e.g., $K_m > 1.1$, but for certain applications, this may be adequate.

A second detector of this type placed in an orthogonal position to the first detector allows determination of a second radiation angle, as well as a distance projected orthogonally to its axis. From this information, the point source position (x,y,z) can be determined.

General applications requiring longer range operation will use three detectors, at least two of which are substantially separated to define three intersecting source planes that define the source position.

In the method of measuring the position of the point source emitter 11 with respect to the detector array 19, reference is made to FIG. 16. As a first step, the image of the mask projected onto the detector array 19 is first recorded. With the emitter 11 activated, the Fast Fourier Transform (FFT) of the image on the detector array 19 is computed. Next, the highest frequency $F_d$ is identified. Then, the degree of magnification of the segment 23 as compared to the segment 21 is calculated. Next, if the process will involve use of a variable frequency mask, the variable frequency peak is determined to yield the "coarse" position. If the variable frequency mask is not being employed, the phase at $F_0$ is determined to yield coarse position. In either case, once the coarse position has been determined, the phases of the frequency components $F_1$ to $F_n$ are determined, followed by determination of the total pattern shift as a sum of the individual frequency component phase shifts. Thereafter, the pattern shift of the magnified image $Y_d$ is determined and the actual unmagnified mask pattern shift is calculated. From the information determined and calculated, the angle of incidence $\theta_y$ is computed.

A second embodiment of the present invention describes a method for determining the angular position of a point source of radiation with respect to a detector by examining the scales and shifts of periodic components of the projected image of a variable transmissivity mask. This embodiment uses the system depicted in FIGS. 1–4 and encodes the transmissivity mask with a single frequency component and a broadband component and computes the frequency spectrum of the received detector pattern. The single frequency component ($f_m$) is generally chosen to be near the maximum frequency recordable by the imaging device and/or the maximum frequency within the diffraction limit, so that the best magnification resolution may be obtained. The broadband function used for correlation ($f_{corr}$) may be represented by a closed form function such as a polynomial or trigonometric function or it may be a numerical function, such as a pseudo-random sequence or universal redundant array. Ideally, the function will have a nearly perfect impulse in the correlation with near zero correlation away from the peak.

The mask transmissivity function is represented as $\mathrm{mask}(nT) = \sin(2\pi f_m nT) + f_{corr}(nT)$ The magnified image function may be expressed as $\mathrm{image}(nT) = \sin(2\pi f_m nT/k_m) + f_{corr}(nT/k_m)$ where $f_m$ is the mask frequency and $f_m/k_m$ is the detector frequency.

If the correlating function is a closed form expression, then the image function is computed directly at $n/k_m$ intervals. If the correlating function is a numerical or pseudo-random sequence, interpolation is used to compute the image mask at $n/k_m$ intervals.

Figure 17:
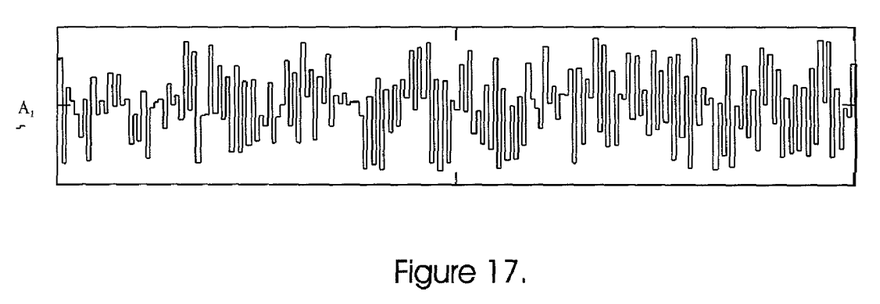
FIG. 17 shows a schematic representation of a function containing a composite frequency used to produce an analog or grey scale mask in a second embodiment.
Figure 18:
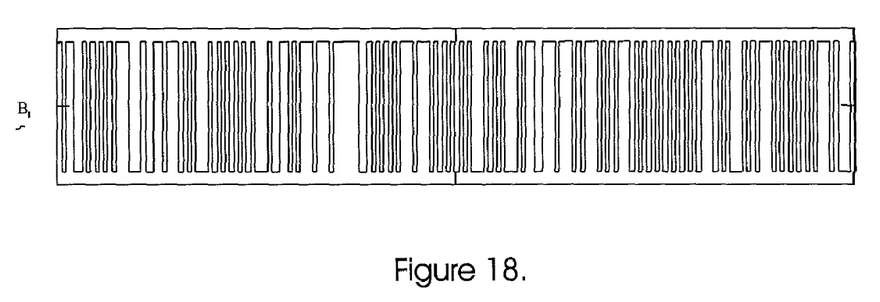
FIG. 18 shows a digital representation of the graph of FIG. 17.

FIG. 17 shows a function containing the composite frequency function used to produce an analog or grey scale mask, while FIG. 18 shows the digital version of the same function.

Figure 19:
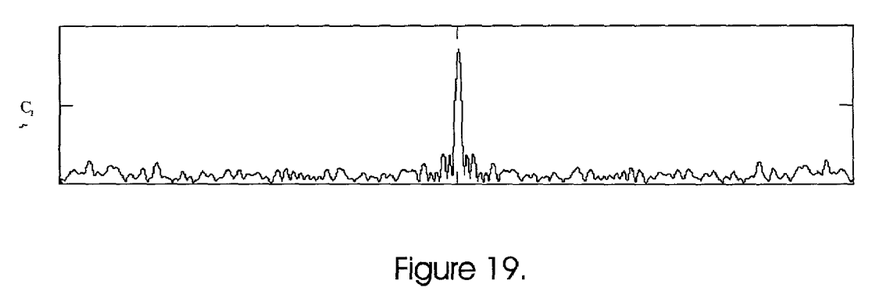
FIG. 19 shows a schematic representation of a fast Fourier transform of the mask pattern illustrated in FIG. 17.
Figure 20:
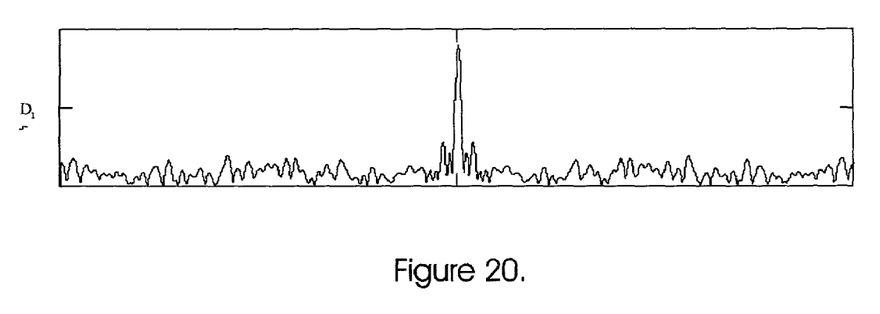
FIG. 20 shows a schematic representation of a fast Fourier transform of the schematic representation of the mask illustrated in FIG. 18.

FIG. 19 is a FFT of the mask pattern of FIG. 17, showing the spectral components, while FIG. 20 is the FFT of the mask of FIG. 18. The analog mask produces no harmonic content, which shows up as noise in frequency domain and is preferred over the digital mask. Ideally, the correlating function spectrum should not overlap the single frequency spectrum to allow the best estimate of the single frequency peak. The example function shown (pseudo-random sequence) does overlap, but the effect on the spectral peak of the single frequency is quite small.

From the FFT plot, the single frequency spectral peak is determined and the scale factor is computed by $$k_m = f_m/f_d$$

Letting g(nT) represent the scaled mask correlation function, $$g(nT) = f_{corr}(nT/k_m)$$

and h(nT) represent the detected image, the cross correlation ($R_{g,h}(\tau)$) is most efficiently computed using the FFT method and is expressed as $$R_{g,h}(\tau) = FFT^{-1}\{FFT\{g(nT)\} \cdot FFT^*\{h(nT)\}\}$$

where the notation $FFT^{-1}$ represents the inverse FFT and FFT* represents the complex conjugate of the FFT. The peak of the correlation function indicates the lag or lateral distance that the image has projected along the detector surface. Note that the periodic function (a sine function in this case) may be kept in the correlating function, but that this adds a periodic component to the correlation function.

Figure 21:
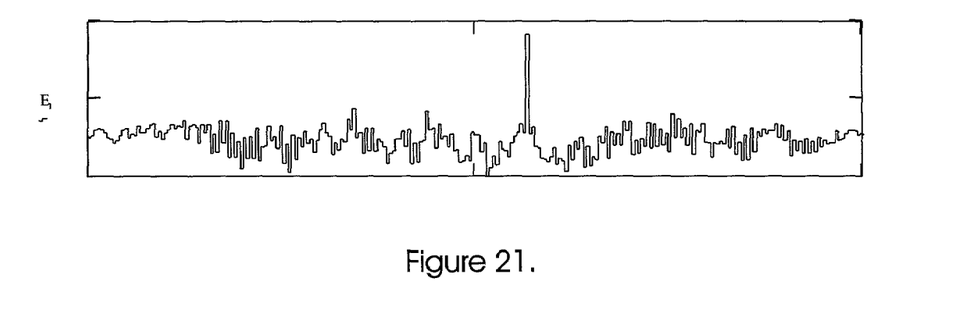
FIG. 21 shows the correlation function produced by correlating the image with the random portion of the mask illustrated in FIG. 21.
Figure 22:
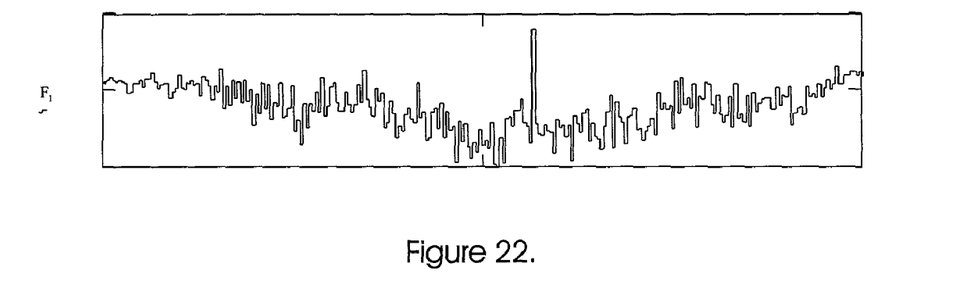
FIG. 22 shows the correlation function produced by correlating the image with the random portion of the mask illustrated in FIG. 22.

FIG. 21 shows the cross-correlation of the composite analog mask function in FIG. 17 with the random component of the analog mask function. FIG. 22 shows cross-correlation of the composite digital mask function in FIG. 18 with the random component of the digital mask function. The correlation function peaks are clearly visible, with the digital mask function producing more artifacts due to digitizing.

An alternative variation of this embodiment uses the unique correlation function peak only to determine a coarse position, while the fine position is determined by the phase of the single frequency component as in the first embodiment.

Figure 23:
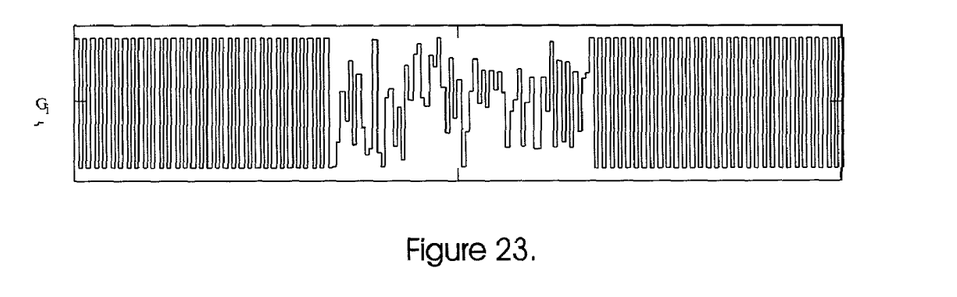
FIG. 23 shows an analog transmissivity mask used in the second embodiment where the single frequency component and pseudo-random component are sequential.
Figure 24:
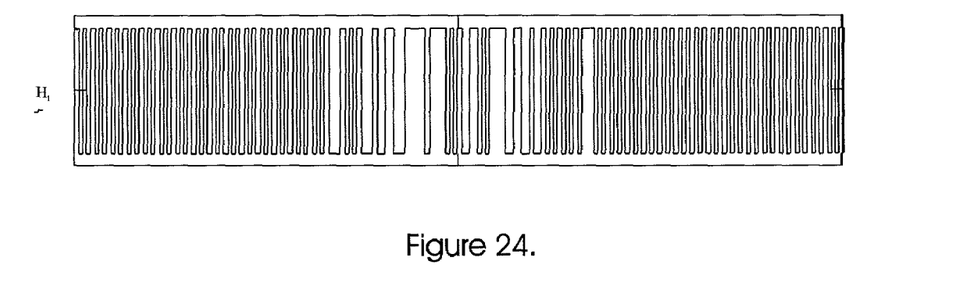
FIG. 24 shows a digital transmissivity mask used in the second embodiment where the single frequency component and pseudo-random component are sequential.

Another variation to this embodiment encodes the single frequency component and pseudo-random component sequentially in transmissivity mask instead of superimposing them. FIGS. 23 and 24 show a schematic representation of this variation. This variation allows the non-periodic function to occupy the central portion of the mask, while the periodic function occupies the remainder of the mask, generally extending beyond the detector width. In this way, the non-periodic function image is fully detected at all angles of incidence, while the periodic function is again for scale identification. The identification of pattern shift is performed using the correlation technique described above. The correlation peak may be used to determine pattern fine shift or it may be used only to determine coarse pattern shift, while the phase of the single frequency component is used to determine the fine pattern. The transmissivity functions may again be either analog or digital as previously shown.

Figure 25:
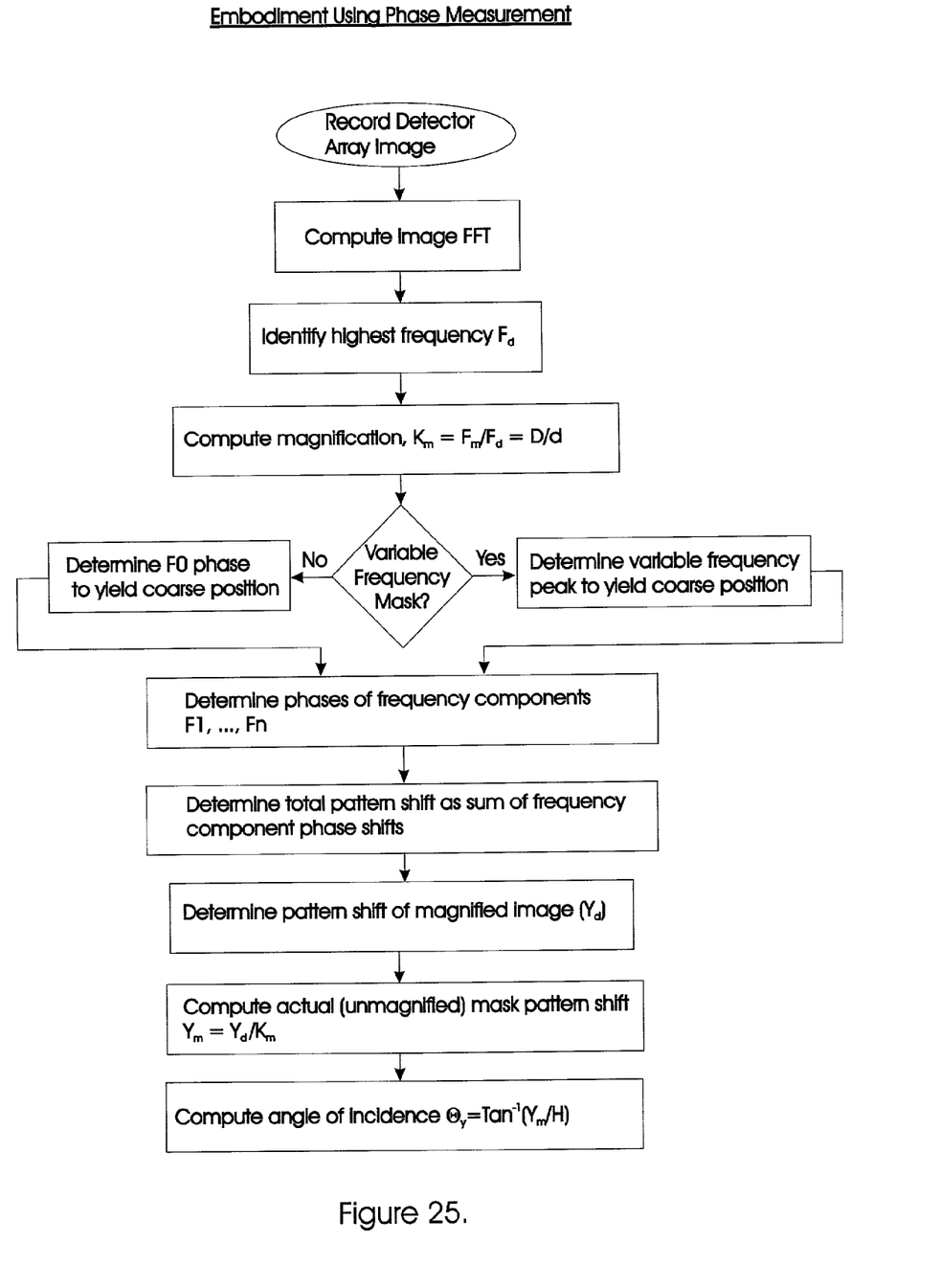
FIG. 25 shows a flowchart of operation of the second embodiment.

With reference to FIG. 25, the practice of the method of the second embodiment will now be described. First, as before, the detector array image is recorded, the FFT of the image is computed, the highest frequency $F_d$ is identified, and the magnification D/d is computed. Thereafter, the method of operation of the second embodiment diverges from the method of the first embodiment. The mask pattern is magnified by a factor of $K_m$. Thereafter, the detector image is compared to the magnified mask pattern using the technique of cross-correlation. From this information, the pattern shift of the magnified image $Y_d$ is determined. From the information previously obtained, the actual unmagnified mask pattern shift $Y_m$ is computed. Finally, the angle of incidence $\theta_y$ is computed.

As such, an invention has been disclosed in terms of preferred embodiments that fulfill each and every one of the objects of the invention as set forth above, and provide a new and useful method of employing a range adaptable system for determining the angular position and distance of a radiating point source, of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A system for determining the angular position and distance of a radiating source with respect to a detector, comprising:
   a) a radiation detector;
   b) a mask spaced in front of said detector, said mask having a plurality of apertures;
   c) recording means for recording an image cast onto said detector by radiation passing through said mask;
   d) computing means for computing data related to said image, said computing means computing a Fast Fourier Transform (FFT) of the image;
   e) identifying means for identifying a highest single frequency of said FFT of the image, said highest single frequency comprising a spectral peak of said FFT;
   f) said computing means including means for computing degree of magnification of said image on said detector as compared to size of said image as it passes through said mask by forming a ratio of maximum detected single frequency to known maximum mask single frequency; and
   g) determining means for determining angular position of said radiation source with respect to said detector.

2. The system of claim 1, wherein said mask apertures comprise a transmissivity pattern varying in one dimension.

3. The system of claim 2, wherein said one dimension comprises a Y-axis.

4. The system of claim 1, wherein said detector and mask are planar and lie in parallel planes.

5. The system of claim 4, wherein said mask and detector are spaced apart by a known distance.

6. The system of claim 1, wherein said determining means includes means for measuring phase of a low frequency of said image to yield coarse position data.

7. The system of claim 1, wherein said determining means includes means for measuring a variable frequency peak of said image to yield coarse position data.

8. The system of claim 6, wherein said determining means includes means for determining phases of frequency components as well as pattern shifts.

9. The system of claim 7, wherein said determining means includes means for determining phases of frequency components as well as pattern shifts.

10. The system of claim 1, wherein said determining means includes means for magnifying a mask pattern by a desired degree.

11. The system of claim 10, wherein said determining means further includes means for comparing a detector image to a magnified mask pattern using cross-correlation.

12. The system of claim 11, wherein said determining means determines pattern shift of said magnified mask pattern.

13. The system of claim 1, wherein said determining means includes means for determining distance from said radiation source to said detector.

14. A method of determining the angular position and distance of a radiating source with respect to a detector, including the steps of:
   a) providing a mask and a detector in parallel planes spaced apart a measured distance;
   b) providing said mask with a plurality of apertures;
   c) activating a point source of radiation which directs radiation through said apertures of said mask and onto said detector as an image;
   d) recording said image;
   e) computing a Fast Fourier Transform (FFT) of said image;
   f) identifying a highest single frequency component of said FFT of said image, said highest single frequency component comprising a spectral peak of said FFT;
   g) computing magnification of said image as compared to a size of said image at said mask by forming a ratio of maximum detected single frequency to known maximum mask single frequency;
   h) determining phases of frequency components of said image from $f_0$ to $f_n$;
   i) determining data resulting from pattern shifts of said frequency components of said image;
   j) computing angle of incidence of said source with respect to said detector.

15. The method of claim 14, wherein before said determining phases step, further including the step of using a variable frequency mask to determine variable frequency peak and coarse position.

16. The method of claim 14, wherein, before said determining phases step, further including the step of determining the phase of a lowest frequency $F_0$ of said image to yield coarse position.

17. The method of claim 14, wherein said determining data step includes the steps of:
   a) determining total pattern shift of said image as a sum of frequency component phase shifts;
   b) determining shift of a magnified image $Y_d$; and
   c) computing actual unmagnified mask pattern shift $Y_m = Y_d/K_m$ where $Y_m$ is the point source, $Y_d$ a detected pattern position and $K_m$ is a pattern magnification factor.

18. The method of claim 14, before said identifying step, further including the step of computing an FFT of said image.

19. A method of determining the angular position and distance of a radiating source with respect to a detector, including the steps of:
   a) providing a mask and a detector in parallel planes spaced apart a measured distance;
   b) providing said mask with a plurality of apertures;
   c) activating a point source of radiation which directs radiation through said apertures of said mask and onto said detector as an image;
   d) recording said image;
   e) computing a Fast Fourier Transform (FFT) of said image;
   f) identifying a highest frequency component of said FFT of said image, said highest frequency component comprising a spectral peak of said FFT;
   g) computing magnification of said image as compared to a size of said image at said mask by forming a ratio of maximum detected single frequency to known maximum mask single frequency;
   h) magnifying said image at said mask pattern by a magnification factor $K_m$;
   i) comparing detector image to magnified mask pattern using cross-correlation; and
   j) determining angle of incidence of said source with respect to said detector.

20. The method of claim 19, before said identifying step, further including the step of computing an FFT of said image.

21. The method of claim 19, wherein said determining angle of incidence step includes the steps of:
   a) determining pattern shift of magnified image; and
   b) computing actual unmagnified mask pattern shift.

22. The method of claim 19, wherein said identifying step includes the step of encoding a single frequency component sequentially.

* * * * *